3,306,720
METHOD FOR THE PRODUCTION OF DIAMOND COMPACT ABRASIVES
Kenneth A. Darrow, Sprakers, N.Y., assignor to General Electric Company, a corporation of New York
No Drawing. Filed May 28, 1964, Ser. No. 371,104
3 Claims. (Cl. 51—309)

This invention relates to the production of diamond compact abrasive products and to improved methods for bonding together small diamond particles into a unified mass to provide a high strength, tough coherent abrasive element, generally referred to as a compact, to be employed in regular use in the general field of cutting, grinding, and sawing hard materials.

In general, the bonding together of diamond particles is proposed by two general mechanisms or a combination thereof; namely, securing direct diamond-to-diamond cohesion or employing a non-diamond bonding agent to provide a link between adjacent diamond particles. This invention is directed to the latter of these mechanisms.

In previous attempts to produce successful diamond compacts employing bonding materials, usually metals, the practice has been to introduce a mixture of diamonds and a powdered bonding material into a reaction chamber, compress the contents of the reaction chamber at room temperature to very high pressures extending into the diamond stable region of the phase diagram of carbon and then to heat the reaction cell to a temperature sufficiently high to melt the powdered metal. The high pressure apparatus disclosed in U.S. 2,947,609, Strong, is one example of means for conducting the aforedescribed process. Such a process and the product resulting therefrom has been described in greater detail in copending application Serial No. 60,045, De Lai, filed October 3, 1960, now issued as U.S. Patent 3,141,746, and assigned to the assignee of this invention. Although a useful and serviceable compact is produced by the practice of the aforementioned method, examination under high power magnification of the compact produced by this method has established that a substantial quantity of the diamond particles originally introduced into the reaction chamber have been badly crushed due to the application of the extremely high pressures, i.e., pressures generally in excess of 70,000 atmospheres due to the fact that the points of some diamonds have been driven against adjacent diamond particles generating ultrahigh pressure concentrations. Attempts to employ lower pressures have not entirely eliminated this defect, which prevents attainment of the full potential strength available for such compacts even though the extent of crushing has been somewhat diminished. Such diamond compacts, wherein some of the diamond particles have been crushed, nonetheless have utility in those applications in which the compact is not subjected during use to sudden shock loads which would cause the crushed diamond bits to fall out of the compact.

Therefore, it is a primary object of the present invention to increase the range of utility of compacts embodying diamond particles by eliminating crushing of diamond particles during the production of the compact.

It is another object of this invention to optimize the abrasive capacity and integrity of a compact comprising diamond particles by eliminating destructive diamond-to-diamond ultrahigh pressure concentrations.

If, in contrast to the aforementioned process, the diamonds and metal powder are introduced into the reaction chamber and the combination is heated in the press to some temperature, which is below the melting point of the metal powder and below the graphitization temperature of diamond, yet which is at a level high enough to permit the metal powder to attain a putty-like state before the application of high pressures, crushing of the diamond particles is substantially eliminated when the high operating pressure is applied to the contents of the reaction cell.

Thus, even though diamond-to-diamond contact may occur in the cell under the applied pressure, the diamond particles remain free to readjust themselves in a putty-like matrix providing a quasi-hydrostatic environment for the diamonds. This mechanism keeps inter-diamond stress applications to a minimum.

Inherent in this mechanism is the movement of the putty-like semi-molten powdered metal matrix in a flowing action around the diamond particles causing the metal bonding medium to closely contact and replicate the diamond surfaces with which it comes in contact even though the temperature is in most instances substantially below the melting point of the metal. Of course, in those instances in which the melting point of the metal matrix employed is very low, it is possible that the metal may be melted, however, the critical feature of this invention is the provision of a hydrostatic or quasi-hydrostatic environment for the diamond particles prior to high pressure application so that during the application of erstwhile diamond-crushing pressures the destructive pressure concentrations are eliminated.

The exact nature of this invention as well as other objects and advantages thereof will be readily apparent from consideration of the following specification containing specific illustrative examples.

In general the method of operation is to carefully pack a quantity of diamond particles smaller than about 10 mesh in size together with an amount of powdered metallic bonding medium, as for example, 316 stainless steel, beryllium copper alloy [4% or les Be and 96%+Cu] or nickel into a sample holder for insertion in a high pressure apparatus. After placing the sample holder in a suitable apparatus within which both high pressures and high temperatures can be controllably supplied, enough pressure (less than about 0.5 kilobar—1 kilobar (kb.) equals 987 atmospheres) is applied to the system to make the electrical contact to enable heating of the sample. The temperature of the sample is raised to about 750–800° C. This temperature is held for several minutes and then the pressure is raised to about 10–15 kb. When the elevated pressure has been reached this pressure is held, the heating is stopped and the sample is allowed to cool. The pressure is then carefully released and the sample is withdrawn from the apparatus. Although the diamond concentration in the compact removed from the sample holder varies with the initial composition of the sample the maximum diamond content is about 50% by volume. Examination and testing of compacts prepared according to this method show that the diamonds are retained in the compact by well-developed mechanical bond with the particular bonding medium; the diamond particles did not appear to be crushed and no voids were present. Compact abrasives prepared by this method are of particular utility for grinding or cutting materials having a hardness between about 7 and 10 hardness on the Moh scale.

*Example 1*

0.06 gm. of diamond crystals smaller than 45 sieve size together with 0.8 gm. of powdered 316 stainless steel (about —325 average particle size) were closely packed into a stainless steel sample holder and inserted in a high pressure apparatus of the belt-type. A low pressure (less than about 0.5 kb.) was applied to the sample to complete the requisite electrical contact to initiate the electrical resistance heating of the sample. The temperature of the sample was raised to about 800° C. and held for about 2 minutes. Thereafter the pressure was increased to about 10–15 kb. whereupon the electric power for heating was cut off. After a cooling period the pressure was released and the sample holder was removed from the apparatus. The diamond compact was separated from the sample holder by breaking with hammer and manually separating. The compact was examined and found to be free of voids and the diamonds particles were well-bonded and appeared to have survived the pressure application intact.

*Example 2*

0.06 gm. of diamond crystals smaller than 45 sieve size together with 0.8 gm. of powdered nickel (about —325 average particle size) were closely packed into a nickel sample holder and submitted to the process outlined in Example 1. The resulting diamond compact was similar in appearance to the compact produced in Example 1 and the diamond concentration was about 25% by volume of the compact.

*Example 3*

0.06 gm. of diamond crystals smaller than 45 sieve size together with 0.8 gm. of the powdered beryllium copper alloy (about —325 particle size) were closely and carefully packed into the stainless steel or nickel sample holder and treated as in Example 1 with similar results. The compact produced was free of voids, showed no signs of diamond crushing and had a diamond concentration of about 25% by volume of the compact.

A very important aspect of this novel method is the fact that the operating temperature remains low enough so that no graphitization of the diamond can occur at the operating pressure and the use of less expensive metals as containers for the diamonds and metal matrix powder for the production of the compact is enabled, i.e, stainless steel cylinders have been successfully used and have not melted. Ordinarily tantalum, titanium or nickel liners are required to withstand the high temperatures in prior art methods.

For some abrading applications, it is desirable that compacts be produced employing a mixture of diamond and tungsten carbide ($W_2C$) as a stiff filler. In the past, such combinations have been produced by cold pressing a mixture of $W_2C$ with a sinterable binder in the form of a powder and small diamond particles to very high pressures to produce a compact having some predetermined shape. The powder mixture of $W_2C$ and binder is in the "green" state at this stage, therefore, the pressed compact after removal from the press must be sintered at temperatures ranging from about 1500° to 2100° C. in a furnace for periods of time extending from about 10 to about 30 minutes. Unfortunately, the time-pressure conditions in combinations required to effect the sintering process by these former methods are severe enough to partially graphitize the diamond. This graphitization is undesirable for the compact is weakened.

An improved method according to this invention is to apply a strongly adherent metal coating, i.e., molybdenum or titanium to the diamond particles, as for example, by the glow discharge ion bombardment method described and claimed in the patent applications filed simultaneously herewith, S.N. 370,872, Vanderslice, and the improvement thereover, S.N. 370,797, Darrow and Hull, which applications are assigned to the assignee of the instant application. Having coated the diamond particles, a powder mixture of "green" $W_2C$ and a braze material for the metal-coated diamonds are packed into a nickel capsule together with the diamonds to be introduced into a reaction chamber in an apparatus within which heat and pressure may be simultaneously applied, i.e., as described in Strong, U.S. 2,947,609. This capsule may be preformed to some desired tool shape to be reproduced in the completed compact, as for example, preformed in the shape of a right circular cylinder having threads rolled into its outside contour to enable screwing the completed compact into a tool socket for cutting operations. The nickel capsule filled with metal-coated diamond particles, the "green" $W_2C$ and the braze material is then enclosed in a graphite block contoured to closely fit around the outside of the capsule and with outside dimensions to fit into a standard sample holder used in a reaction chamber in a high pressure apparatus.

Contrary to the cold pressing techniques employed in the past, this novel method provides that for about the first 10 seconds of operation, the pressure is to be kept as low as possible, that is, at the minimum pressure required for making electrical contact in order to operate the heating mechanism. Depending upon the apparatus, the pressure will not exceed about 0.5 kilobar. During this period of low pressure application the temperature of the mixture is raised to and held at a temperature between about 800° and about 900° C. After the 10-second interval, the pressure is raised to within the range of from about 10–15 kb. (internal cell pressure) and the temperature is raised to about 1100° C. and held just long enough to melt the braze material, about 5 seconds or less. The heating is then ceased, the sample is allowed to cool, the pressure is returned to atmospheric and the sample holder is removed. The compact is then isolated and cleaned.

During the initial heating at relatively low pressure, the mixture of tungsten carbide and braze material is rendered capable of some degree of flow prior to the subsequent application of the heavy pressure to the compact simultaneous with the high temperature. As in the above description, this mechanism provides a quasi-hydrostatic environment for the diamond particles permitting their reorientation relative to each other to avoid ultra high pressure concentrations and reducing or eliminating overstressing and crushing of the diamonds.

After the power is shut off and the capsule is allowed to cool before removal from the press, no additional heat treatment is required, the entire sintering operation having been conducted in a small fraction of the total time previously required.

When molybdenum is used as the coating metal for the diamond crystals, copper may be successfully employed as the braze material for effecting the bonding of the coated diamonds. The tungsten carbide sintered during the rapid heating step is interspersed through the whole of the compact and serves to stiffen the structure of the compact aiding the diamond crystals to resist shifting during use, which shifting would destroy or weaken the bond holding the diamond crystal in the compact.

In order to promote the contact between the molybdenum coating and the copper, the molybdenum coated diamonds may be in turn coated with copper as by the aforementioned glow discharge method. Additional powdered cooper is generally provided, however.

Likewise, when titanium is employed as the coating metal for the diamond crystals, an alloy (48 weight percent silver, 32 weight percent copper and 20 weight percent tin) may be used as the brazing material therefor. In addition it is preferred to use a titanium sample holder to receive the components of the compact.

By the use of the invention described herein, the crushing of diamond particles in the production of abrasive compacts can be substantially eliminated. As a result compacts of diamond particles with bonding materials therefor may be produced which have enhanced utility, that is, a wider range of abrasive application.

Various modifications are contemplated and may obviously be resorted to by those skilled in the art without departing from the spirit and scope of the invention as hereinafter defined by the appended claims.

What I claim as new and desire to secure by Letters Patent of the United States is:

1. A method of bonding together diamond particles into a tough, coherent high strength diamond compact abrasive, which method comprises:
   (a) heating a mixture of metal-coated diamond crystals, "green" tungsten carbide and a brazing material for the metal of the metal coating of said diamond crystals to a temperature in the range of about 800° C.–900° C.,
   (1) said brazing material having a melting point of less than about 1100° C. and being flowable with said tungsten carbide under the application of pressure in excess of about 10 kilobars at temperatures in excess of 800° C.,
(b) applying a pressure of over about 10 kilobars to said mixture to urge said diamond crystals into close contact with each other and to force said tungsten carbide and said brazing material to flow over the surfaces of said diamond crystals and conform to the shape of the diamond surfaces, and simultaneously heating said mixture to about 1100° C.,
(c) ceasing the heating and allowing said mixture to cool to ambient temperature,
(d) reducing the pressure to ambient pressure, and
(e) removing a sintered conglomerate of metal-coated diamond, tungsten carbide and brazing material containing a maximum of about 50 percent diamond by volume.

2. A method of bonding together diamond particles by the use of a metallic bonding medium to provide a tough, coherent high strength diamond compact abrasive which comprises:
(a) heating a mixture of diamond crystals and bonding medium to an operating temperature in the range of from about 750° C. to about 800° C.,
   (1) said metallic bonding medium having a melting point substantially in excess of the operating temperature but being flowable at the operating temperature under the application of pressure in excess of about 10 kilobars,
(b) applying a pressure of over about 10 kilobars to said mixture after operating temperature has been reached to urge said diamond crystals into close contact with each other and to force said metallic bonding medium to flow over the surfaces of said diamond crystals and conform to the shape of the diamond surfaces,
(c) ceasing the heating when the operating pressure has been reached and allowing said mixture to cool to ambient temperature,
(d) reducing the pressure to ambient pressure, and
(e) removing the conglomerate of diamond and metallic bonding medium,
   (1) said conglomerate containing a maximum of about 50 percent diamond by volume.

3. The method recited in claim 1 wherein the heating to about 1100° C. does not exceed about 5 seconds duration.

References Cited by the Examiner
UNITED STATES PATENTS

| | | | |
|---|---|---|---|
| 2,137,329 | 11/1938 | Boyer | 51—309 |
| 2,210,039 | 8/1940 | Petrie | 51—309 |
| 2,367,404 | 1/1945 | Kott | 51—309 |
| 2,737,454 | 3/1956 | Danec | 51—309 |
| 2,828,197 | 3/1958 | Blackmer | 51—309 |
| 3,141,746 | 7/1964 | De Lai | 51—309 |
| 3,203,775 | 8/1965 | Cantrell | 51—309 |
| 3,239,321 | 3/1966 | Blainey | 51—309 |

ALEXANDER H. BRODMERKEL, *Primary Examiner.*
ROBERT F. WHITE, *Examiner.*
D. J. ARNOLD, *Assistant Examiner.*